United States Patent [19]

Dennen

[11] 4,154,657
[45] May 15, 1979

[54] DUAL DOME STRUCTURE FOR OBTAINING HEATING THROUGH SOLAR ENERGY

[76] Inventor: Nancy L. Dennen, 15 Ponderosa Pl., Hewitt, N.J. 07421

[21] Appl. No.: 879,592

[22] Filed: Feb. 21, 1978

Related U.S. Application Data

[63] Continuation of Ser. No. 594,740, Jul. 10, 1975, abandoned.

[51] Int. Cl.² ............................................. B01D 1/02
[52] U.S. Cl. ................................. 202/234; 159/1 S; 159/28 L
[58] Field of Search ............................. 202/234, 235; 203/DIG. 1; 159/1 S, 28 L; 126/270, 271; 237/1 A; 60/641; 52/2, 80; 47/17, 19

[56] References Cited

U.S. PATENT DOCUMENTS

| 2,213,894 | 9/1940 | Barrq | 126/271 |
|---|---|---|---|
| 2,636,129 | 4/1953 | Agnew | 159/1 S |
| 2,680,565 | 6/1954 | Lof | 237/1 A |
| 2,696,465 | 12/1954 | Kittredge | 259/24 R |
| 2,902,028 | 9/1959 | Manly | 202/234 |
| 2,975,107 | 3/1961 | Friedman | 203/DIG. 1 |
| 3,258,060 | 6/1966 | Chirico | 159/20 CS |
| 3,338,001 | 8/1967 | Fraser | 52/2 |
| 3,353,309 | 11/1967 | Kwake | 52/2 |
| 3,420,745 | 1/1969 | Schlueter | 159/15 |
| 3,475,868 | 11/1969 | Johnson | 52/2 |
| 3,634,128 | 1/1972 | Bolin | 159/27 R |
| 3,908,631 | 9/1975 | Rom | 52/2 |

FOREIGN PATENT DOCUMENTS

| 1247270 | 10/1960 | France | 159/15 |
|---|---|---|---|
| 46-15375 | 9/1971 | Japan | 159/15 |
| 235563 | 2/1926 | United Kingdom | 126/270 |

*Primary Examiner*—Hiram H. Bernstein
*Attorney, Agent, or Firm*—Kenyon & Kenyon, Reilly, Carr & Chapin

[57] ABSTRACT

A dual dome structure comprising a first hemispherical dome of smaller diameter and a second hemispherical dome of larger diameter, the second hemispherical dome being of a material such as glass which will pass the rays of the sun to thereby create a highly heated space between the two domes. In accordance with one embodiment copper tubing is wound helically on the inner dome and salt water supplied thereto whereby the salt water will be evaporated and can be condensed to form fresh water. In a second embodiment the use of the dual dome structure to form a habitable space inside the inner dome is disclosed.

16 Claims, 5 Drawing Figures

DUAL DOME STRUCTURE FOR OBTAINING HEATING THROUGH SOLAR ENERGY

This is a continuation, of application Ser. No. 594,740 filed July 10, 1975 and now abandoned.

BACKGROUND OF THE INVENTION

This invention relates to heating apparatus in general and more particularly to an improved solar heating apparatus.

The need for more and better sources of fresh water for various uses throughout the world has received much attention of late. It is recognized that our present water supplies will be insufficient to meet future needs. In addition, attempts to desalinize sea water near desert areas for use in irrigation and other purposes has been recognized. The ability to convert sea water to fresh water efficiently and cheaply can make available large areas of land for use in growing crops, which areas formerly were arid and useless.

Various attempts in using solar energy to distill water have been made. In each case, the disclosed apparatus has been considerably complex and costly. For example, in U.S. Pat. No. 2,975,107 a system is disclosed in which the salt water is boiled in a vessel which has heat from the sun directed on its base by means of a reflector. Clearly the vessels involved along with the necessary reflectors result in a large expense.

In another type of device disclosed in U.S. Pat. No. 3,351,536 designed particularly for emergency use at sea, a solar dome which fits over a box-like container, the dome containing lenses, is provided. The necessity to form a lensed dome and the small size of a unit of this type makes it impracticable for converting larger quantities of salt water. In an arrangement disclosed in U.S. Pat. No. 3,775,527 a transparent dome condenses solar energy and heats sea water in a container there beneath. A continuous channel for conveying vaporized liquid to a condenser tank is contained along the periphery of the dome. This too is a relatively complex system. Finally in U.S. Pat. No. 3,616,270 pressure vessel plates with tortuous water conduits therein for absorbing the sun's energy are employed for conversion purposes. Naturally, such a large area of metal plates, if it is to be made of a highly conductive material such as copper will be extremely expensive.

Thus, although it has been recognized that solar energy can be used for converting salt water into fresh water in a desalinization process, the apparatus used in the prior art has been relatively complex and expensive to build. Thus, the need for an improved type of apparatus which is simple and inexpensive becomes evident.

Attention has also been directed to the use of solar energy for heating habitable structures. Such use of solar energy has become particularly important in view of the recent energy crisis. Thus, in addition to the need for improved apparatus for desolarization, there is also a need for arrangements which permit using solar heat for heating habitable spaces.

SUMMARY OF THE INVENTION

The present invention discloses a dual dome structure which finds application both in desalinization and in providing a heated habitable space.

The essential elements of the structure are an inner dome of smaller diameter and an outer dome of larger diameter. The outer dome is made of a material such as glass which will transmit the sun's rays. Preferably the inner dome is non-transmitting or transmits to a lesser degree so that energy is trapped in the space between the two domes to heat that space to an extremely high temperature.

In the first embodiment disclosed the inner dome has a copper tubing wound about it in helical fashion. Salt water is supplied to the copper tubing and the intense heat generated in the space between the two domes used to evaporate the salt water. The stream so generated is then condensed in conventional fashion or by using an apparatus along the lines of the generating apparatus. Such a condensing apparatus again comprising dual domes is also disclosed. This dual dome apparatus has an outer dome which tends to reflect the sun's rays. Thus, the space between the two domes becomes an insulating space and a cooling medium can be supplied to the inner dome to condense the steam flowing through tubing wound thereabout. In one embodiment the feed water provided to the first dual dome structure where evaporation takes place is used as a cooling medium to condense the steam.

In a second illustrated embodiment the dual domes structure is used to provide a habitable space. Such may comprise a barn, workshop or the like. With certain adaptations such a structure might also be used as housing. The construction is quite similar to the evaporating dome in the desalinization unit with the outer hemisphere being transparent to the sun's rays and the inner dome at least less transmissive. A dome which transmits some light is helpful in such an application since it will result in a structure which is not only heated by solar energy but also lighted thereby. For example, a translucent inner dome might be used. The outer dome is provided with openings to permit fresh air to enter the space between the two domes where it is heated. This heated air makes its way through additional openings in the inner dome to the space inside that dome which constitutes the space for habitation. An exhaust fan is preferably located in an opening in a duct running from an opening in the top of the inner dome to an opening in the top of the outer dome to exhaust air. Thus, this embodiment provides a habitable space which is both heated and lighted by solar energy and which has good air circulation.

DETAILED DESCRIPTION OF THE PREFERRED EMBODIMENT

Figure 1:
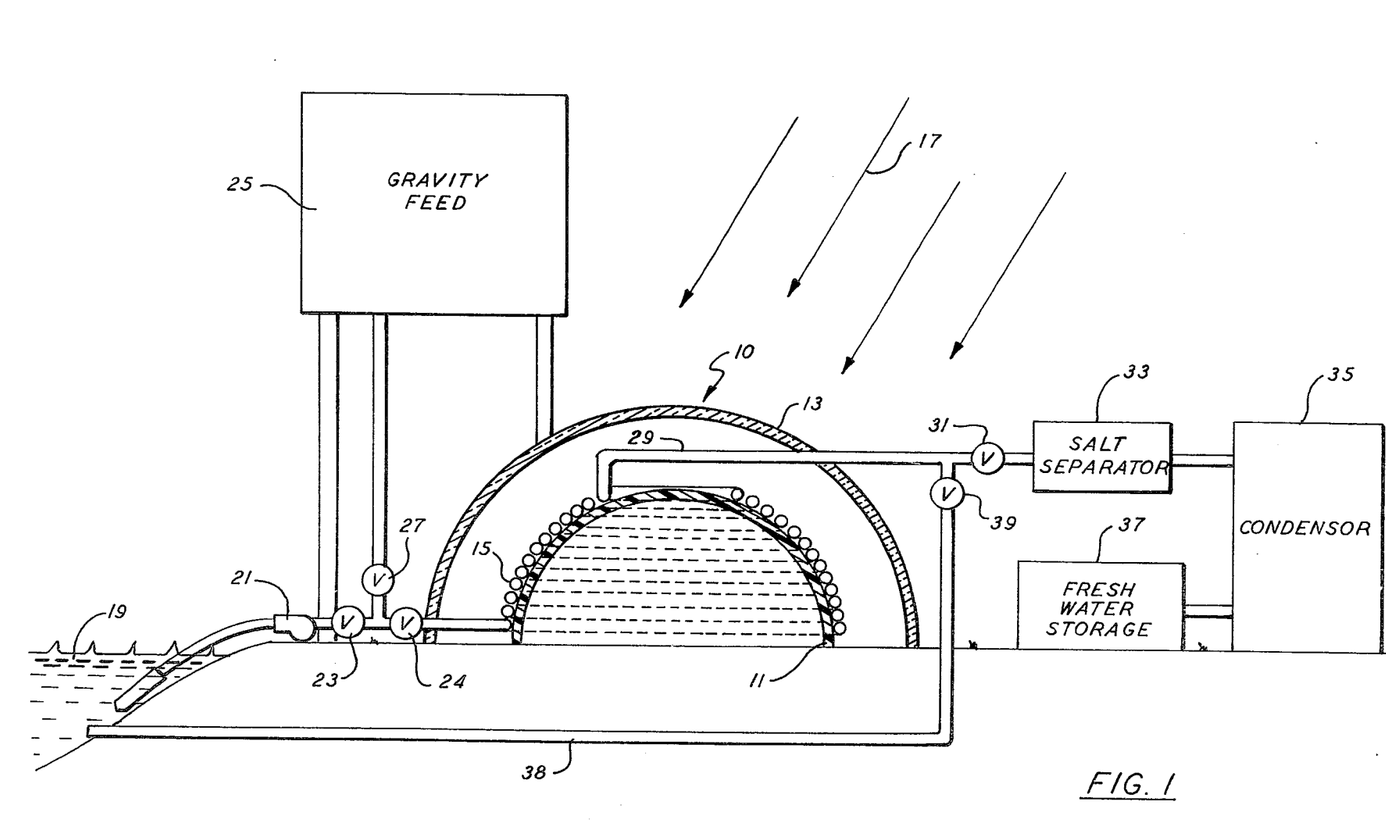
FIG. 1 is an illustration of a first embodiment of the present invention used as a desalinization apparatus.

FIG. 1 illustrates the basic elements of the present invention. The distillation or evaporating portions of the system comprises an inner hemispherical dome 11 and an outer hemispherical dome 13 with copper tubing 15 wound helically around the inner dome 11. The outer dome 13, of necessity must be transparent to permit trapping of the heat generated by the sun's rays between the domes 11 and 13. Preferably the dome 13 will be of glass, in particular, a glass referred to as Chemcor manufactured by the Corning Glass Company. This glass remains stable at temperatures up to at least 700° C. Although the inner dome can be made of any suitable material such as aluminum, stainless steel, or even glass, the preferred material is a polycarbonate plastic material such as that known as LEXAN produced by General Electric and a material known as VESTEL produced by duPont. Preferably, the inner dome 11 will be non-transparent so that heat will be retained rather than passed through by means of the sun's rays passing through. It is possible to use a transparent plastic as the outer dome 13, although it is felt that better results will be obtained using a glass such as the one mentioned above.

It will be recognized that when speaking of the hemispherical dome deviations therefrom are also to be considered. However, the hemispherical shape or something quite close thereto e.g. an ellipsoidal or paraboloidal segment, is most advantageous since it makes use of the sun's rays at all possible angles. Furthermore, it is thought that molding such a dome will be simpler than molding some other shape.

The primary advantage in using the glass and the plastic mentioned above is that the distillation chamber can be formed in an extremely simple fashion. That is to say, the glass mentioned above along with the plastics can easily be molded. Thus, once the proper molds are set up, and molds of extremely large sizes are possible, the units can be mass produced in simple fashion. The only copper required in the system is the copper tubing 15. Thus, these units can be mass produced at an exceptionally low cost. For the purpose of supplying salt water to the distillation unit from a salt water source 19 a pump 21 is shown. The pump may either directly pump water through valves 23 and 24 to the copper tubing 15 or, alternatively, may be used to fill a gravity feed tank 25 which will then supply the salt water to the tubing 15 through valves 27 and 24. Salt water passes through the tubing 15 where it is heated by the intense heat which is generated in the space between the two domes because of the sun's rays to the point where, by the time it reaches the outlet line 29, it is in the form of steam. The steam passes through a valve 31 to a salt separator 33 where any salt which is carried over is separated out. The salt separator may take the form, for example, of the salt separating unit disclosed in the aforementioned U.S. Pat. No. 3,616,270. The steam is then directed into a condenser 35 where it is condensed to result in fresh water which is then stored in a fresh water tank 37, or, should the units be used for irrigation purposes directed to appropriate distribution lines for irrigation purposes or the like if desired.

The condenser 35, can, of course, be of a conventional design. For example, condensers such as that shown in any of the aforementioned U.S. Pats. may be used. In particular, a condenser such as that shown in U.S. Pat. No. 3,558,436 in which the salt water supply is used for cooling and condensing the steam may be used. In such a case the feed to the copper tubing 15 of FIG. 1 would be by way of the condenser 35. As will be well recognized by those skilled in the art this results in a slight pre-heating of the salt water giving a more efficient operation.

The copper tubing 15 will of course, after some use, contain salt deposits. It will be recognized that the unit can be used only during the daylight hours when sufficient sunlight is available. Thus, a valve 39 is provided from which a line is directed back to the salt water supply 19. After operation has ceased for the day, valve 31 is closed and valve 39 opened. Valve 27 will be closed and valves 23 and 24 open. The pump 21 will then be operated to pump salt water through the piping 15 to wash out the salt deposits therein. Naturally, should clogging occur during operation such a flushing of the system can take place at that time.

Figure 2:
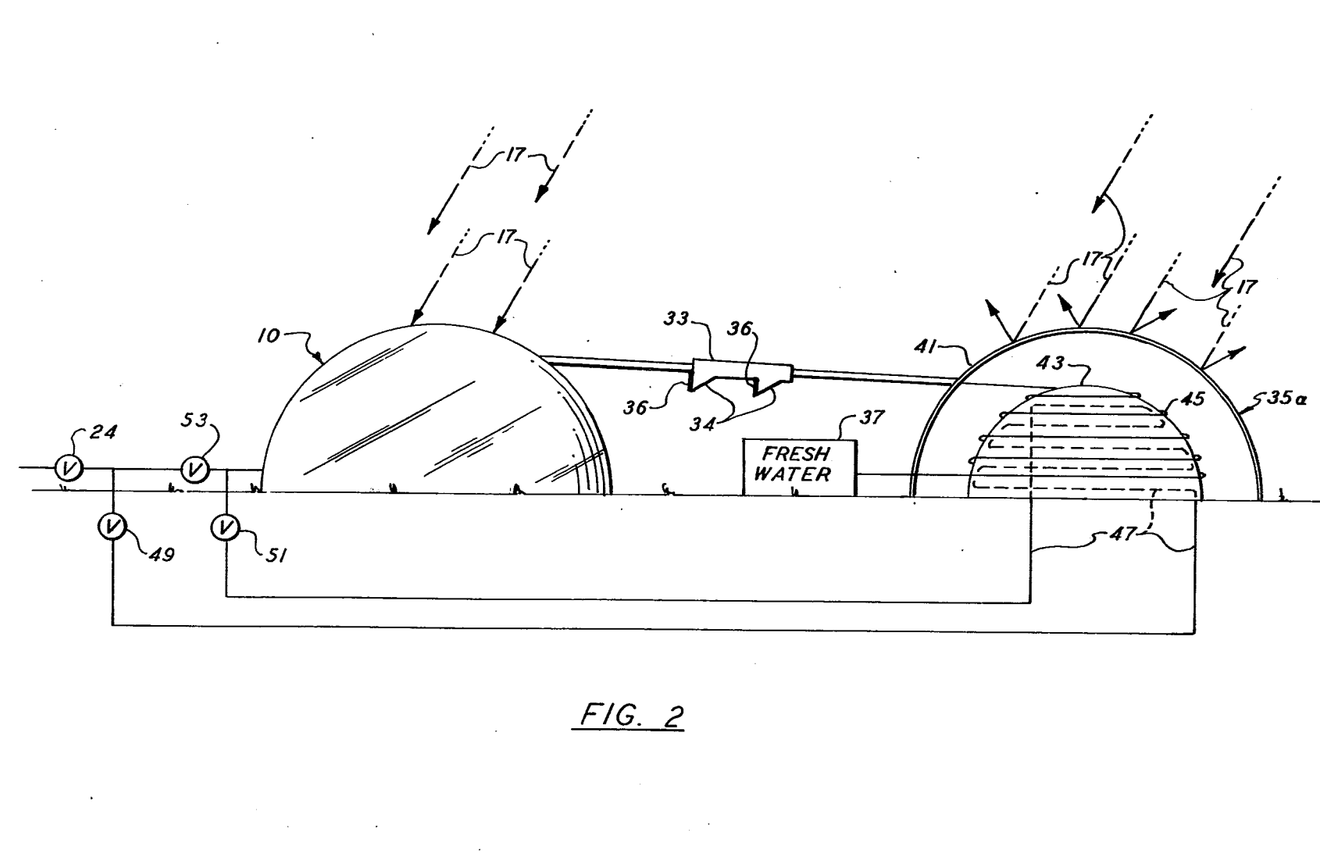
FIG. 2 is a schematic drawing of an installation similar to that of FIG. 1 in which the dual dome structure of the present invention is also used in implementing a condenser.

FIG. 2 shows a system in which the feed water is passed through the condenser prior to being supplied to the evaporating unit 10. It also shows a form of condenser which uses a structure 35a similar to the evaporator structure. In this case the condenser 35a comprises an outer hemisphere 41 preferably made of plastic and an inner hemisphere 43 which might be a plastic or glass. Inner hemisphere may also be of highly thermal conductive material such as aluminum or steel. Preferably the outer surface of the hemispherical dome 41 will have a reflective coating so as to reflect the sun's rays 17. In a manner similar to the arrangement of the tubing 15, tubing 45 is provided which is wound helically around the dome 43. In the illustrated embodiment, a line 47 inside the dome structure 35a is shown as a dotted line. This line contains the feed water obtained from the output of valve 24 of FIG. 1 there being installed additional valves 49, 51 and 53. Feed water from valve 24 is directed through valve 49 with the bypass valve 53 closed. It flows through line 47 inside the dome 43 and back through an open valve 51 to supply the tubing shown on FIG. 1. The relatively cool feed water passing under the dome 43 condenses steam in the tubing 45 and at the same time is preheated. This results in more efficient operation.

FIG. 2 also illustrates an alternate salt separator 33. In this embodiment a unit with troughs 34 closed off by hinged doors 36 is used to collect salt carried over by the steam.

Of course, in addition to the disclosed cooling system for the condenser utilizing the feed water on line 47 other arrangements can be used. For example, cooling equipment such as an air conditioning unit can be contained beneath the dome 43 with the cooled air therefrom directed into the space between the two domes. Furthermore, if the installation is close to a supply of salt water the condenser could possibly by submerged in the salt water. It should also be noted at this point that although salt water is spoken of, distillation apparatus of the present invention can be used to purify any type of unclean water. The significant advantage in this type of construction of the condenser is that the same molds which were used to form the structure 10 can also be used to form the condenser 35a thereby further reducing the overall system cost.

The dual dome of the present invention can also find application as a solar heated structure. As noted above, the glass and plastic materials can be made in extremely large sizes. Thus, an igloo type structure comprising the dual domes of the present invention and which is heated by solar heat can be constructed. For example, such a device might find application as a barn, workshop or the like. As illustrated on FIG. 3 inner and outer domes 11 and 13 constructed in accordance with FIG. 1 are provided. The domes at their top have a circular cutout into which is inserted a duct 61 containing therein a centrifugal fan 63. The outer dome 13 also has a plurality of air openings 65 at its bottom. The inner dome 11 has similar openings 67 which can be covered with hinged flaps 69. These openings are connected to ducts 71 extending partially up the outside of the dome 11. The fan 63 is coupled to a thermostat 73 which controls its operation in conventional fashion. In operation, cool air enters through the openings 65 and is heated in the space between the two domes whereupon it rises toward the top. As heat is required inside the dome 11, fan 63 is operated to draw the heated air through the ducts 71 and openings 67 into the interior space underneath dome 11. Air is then exhausted out through the fan 63. By making the inner dome 11 such that it transmits light, this arrangement provides not only a heated and ventilated space but also a lighted space usable during the daylight hours. At other times, the hinge flap 69 can be closed and auxiliary heating equipment used to heat the space. Even during these periods the dual dome structure acts as an insulator cutting down the amount of heat which would otherwise be needed.

Figure 3:
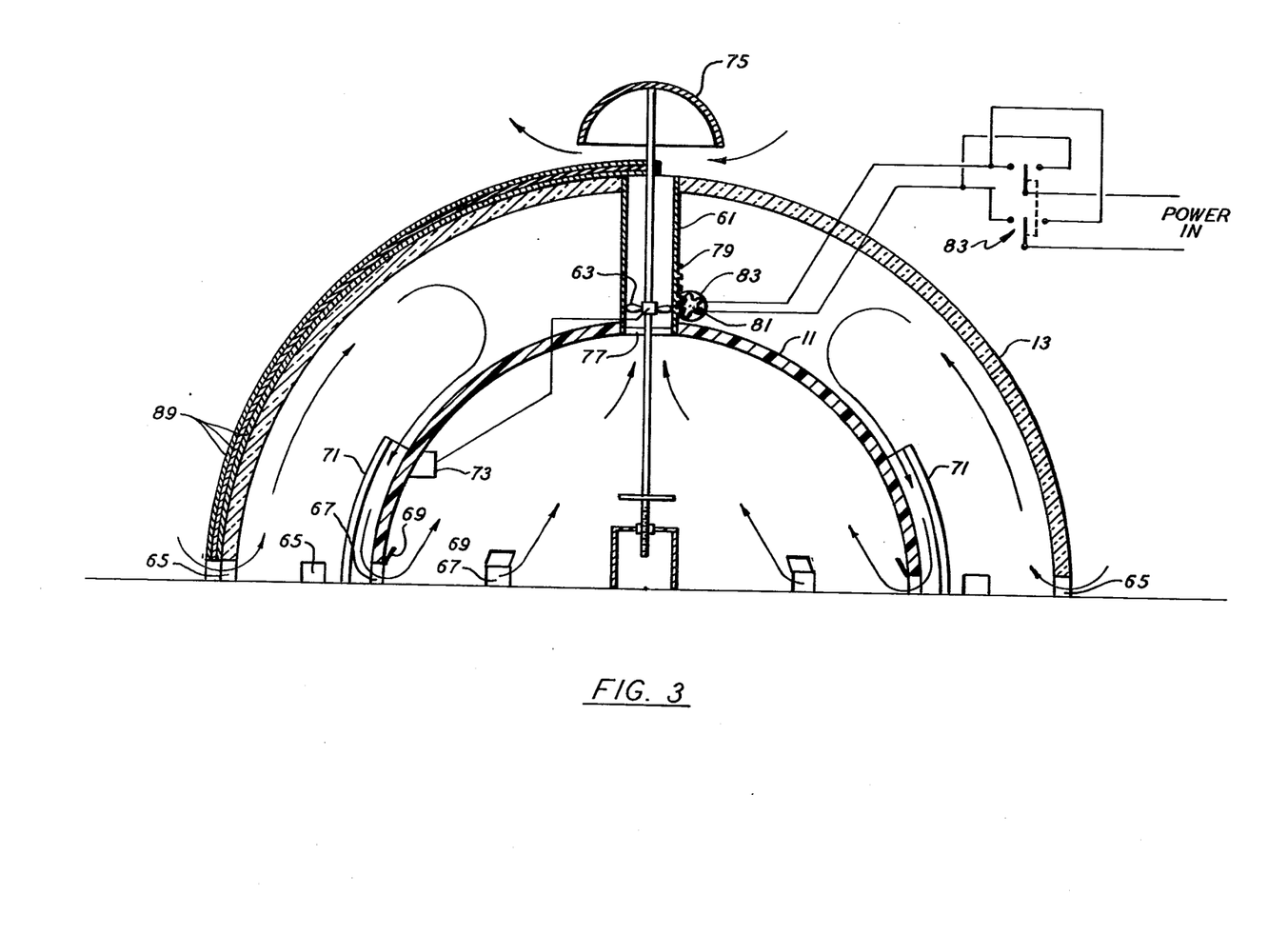
FIG. 3 is a cross sectional schematic view illustrating the application of the dual dome structure of the present invention to form a solar heated habitable space.

Preferably the opening in the top of the dome will have a cover 75 placed thereover to keep out rain water and the like. A screen 77 can be installed at the duct 61 or any other appropriate position to keep out flying insects and the like. Rather than using a screen, an appropriate filter may also be used. As illustrated, it is also possible to mount the sleeve or duct 61 for sliding motion. Shown is rack gear 79 and pinion gear 81 on the end of a motor 83 driven by power switched through a double pole-double throw switch 83. The switch, although shown schematically on the drawing, will be appropriately located inside the dome and the operation thereof will permit raising and lowering the duct 61. In such a case, air can enter between the domes from the top as well as the bottom to improve circulation. Thus, it could be opened during the day to improve circulation and closed at night to retain heat. Preferably, the hood or cover 75 will be mounted on a rod 85 to permit raising and lowering it so that it can be lowered against the outer dome 13 to completely enclose the structure. The rod 85 can also perform another function. Since on warmer days it may be desired to reflect heat away, reflecting panels may be provided made of a lightweight reflecting material such as aluminum. These panels may be made so as to be rotatable about the shaft 85. In the illustrated embodiment, three such panels 89 are shown one stacked upon the other. When essentially full sunlight is desired, these can be so stacked. For example, with only four panels in use, each covering 90°, 270° would be available for sunlight.

Figure 4:
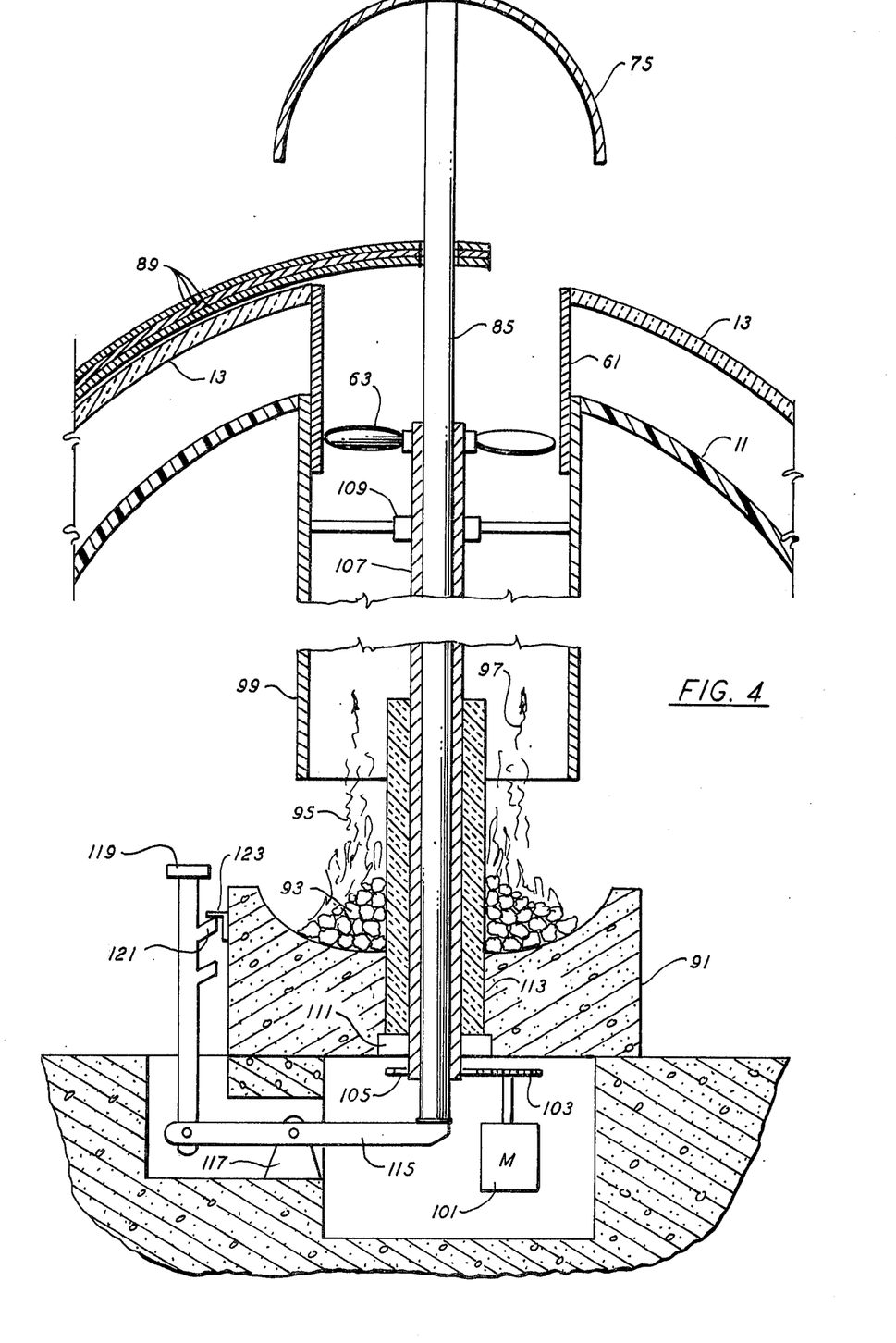
FIG. 4 is a cross-sectional view of further modifications of the structure of FIG. 3.

FIG. 4 illustrates further modifications of a structure such as that shown on FIG. 3. Shown in somewhat more detail are portions of the reflecting panels 89 resting on the outer dome 13. Shown specifically is an advantageous arrangement of the inner pole 85 for raising and lowering the hood 75. In this arrangement centrally located within the structure is a fireplace 91. Shown in the fireplace are a plurality of coals 93 which are burning and emitting flames 95 and combustion gases 97. Surrounding the central rod 85 is a chimney 99 which directs these hot gases to the top of the dome structure. Also shown is a manner of driving the fan 63. Fan 63 is driven by a motor 101 coupled through gears 103 and 105 to a hollow shaft 107 surrounding the rod 85. As illustrated hollow shaft 107 is supported in suitable bearings 109 and 111. The fan 63 is rigidly attached to the top of the hollow shaft 107. Surrounding the shafts 107 and 85 in the vicinity of the fireplace 91 is a layer of appropriate insulating 113. Typically the structure will be on a base of concrete and in the illustrated embodiment a suitable tunnel is made below the fireplace to contain the motor 101 and gears. In addition a lever 115 pivoted about a fixed pivot 117 and coupled to a rod 119 which includes means 121 cooperating with a bracket 123 fastened to the fireplace 91 is provided for raising and lowering the rod 85.

Figure 5:
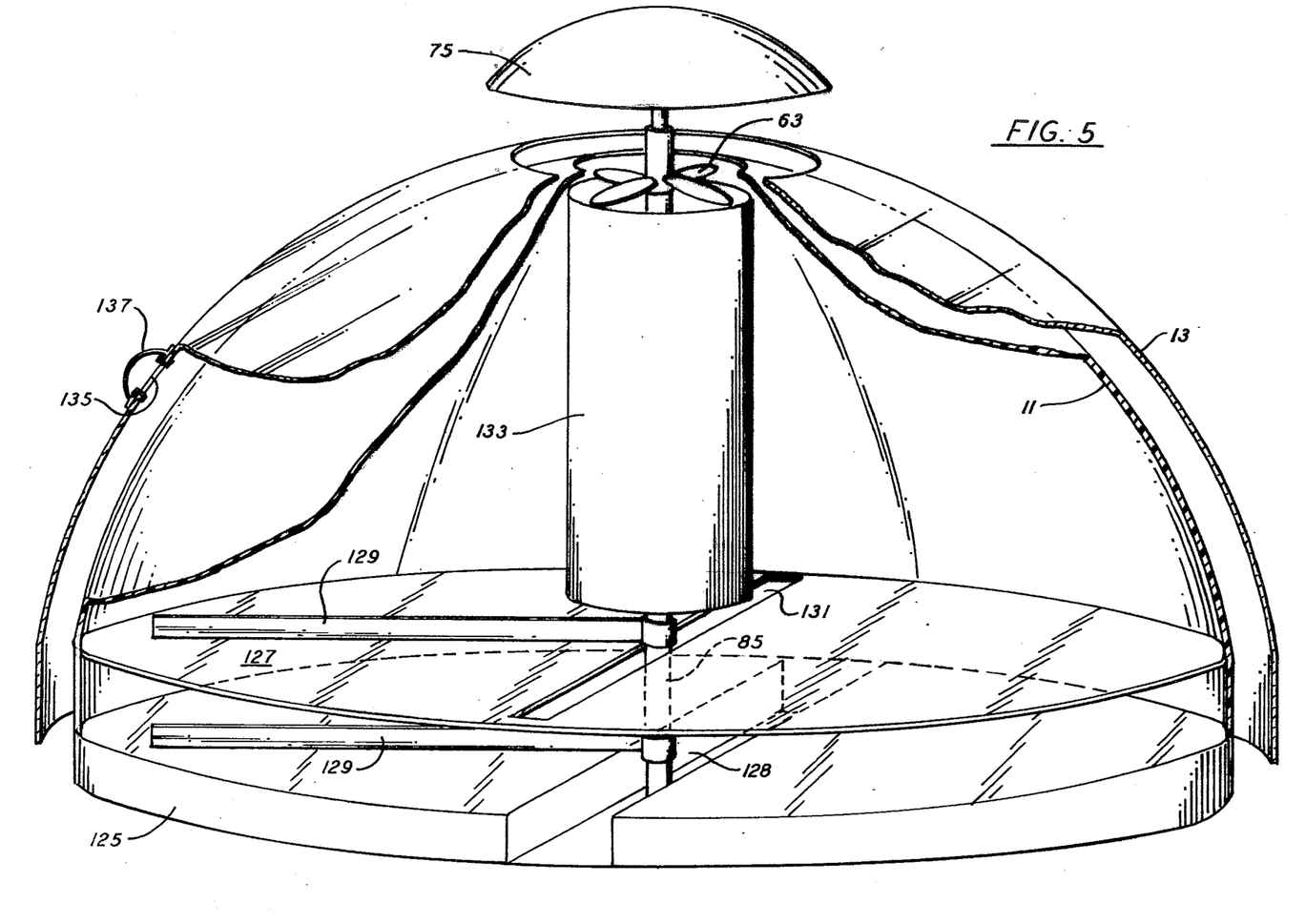
FIG. 5 is a perspective view partially in cross-section of a structure according to the present invention in the form of a barn.

FIG. 5 illustrates a specific embodiment of a structure in the form of a barn. The construction is basically the same as that described above with the inner and outer hemispheres 11 and 13. Preferably the barn will be built on a concrete base 125 and, because of its size will most probably have to be built in sections, e.g., each hemisphere will be made up of four or more sections. The sections may be attached to appropriately curved steel or aluminum supporting members in the shape of an I cross section to which the sections may be bolted. This will also permit imbedding the ends of the supporting members in the concrete base or in the ground as desired. The illustrated structure has a raised floor 127 above the floor formed by the , concrete base 125. A drainage ditch is installed in this concrete floor for draining out waste. On both the concrete floor 125 and raised floor 120 rotating cleaning implements 129 are installed journaled about the central rod 85. Preferably, the floor 127 will contain a plurality of openings to permit washing, with the water running down to the lower floor. Solid material will be scraped by the upper scraper 129 and discharged through an opening 131 to the drainage ditch. The lower portion of space between the two domes can be used for hay storage. In addition, centrally located and forming the exhaust outlet for the structure is a silo 133. It will have appropriate openings on the bottom and the air exhausted by the fan 63 will be exhausted through the silo 133 providing excellent ventilation for it. In addition, the plastic sections can be equipped with small openings with a ridge and cap as shown by the openings 135 and cap 137. Such will be particularly useful in certain areas where sudden decreases in atmospheric pressure can be experienced. In such a case, the covers 137 would pop off to equalize the pressure to prevent the structure from exploding or being otherwise structurally damaged.

Note also that in FIG. 5 the inner and outer domes 11 and 13 have their opening in the same horizontal rather than vertical plane. In this structure particularly, such can improve the air flow through the space between the two domes.

Thus, a dual dome structure which is particularly applicable in the use of solar energy for the evaporation of salt water to convert it to fresh water and also for providing a heated structure has been shown. Although specific embodiments have been illustrated and described, it will be obvious to those skilled in the art that various modifications may be made without departing from the spirit of the invention which is intended to be limited solely by the appended claims.

What is claimed is:

1. A structure for evaporating salt water using energy from the sun comprising:
   (a) a first dome having a first diameter;
   (b) a second dome of a second larger diameter placed concentrically around said first dome to form a closed space between said first and second domes said second dome being of a material which is capable of transmitting solar energy;

(c) copper tubing having two ends wound helically around said first dome in the space between said first dome and second dome whereby said copper tubing will be heated to a high degree when exposed to solar energy to evaporate any salt water contained therein;

(d) means coupled to one end of said copper tubing for supplying salt water thereto at a rate such that all salt water supplied thereto will be evaporated;

(e) means coupled to the other end of said copper tubing for condensing steam formed therein; and (f) means coupled to said tubing to permit connecting said other end of said tubing to a discharge line thereby permitting water to be passed through said tubing and said discharge line to flush out salt deposited within said copper tubing.

2. Apparatus according to claim 1 wherein said condensing means comprise:

(a) a third dome having a third diameter; and (b) a fourth dome having a diameter larger than said third dome, said fourth dome being constructed so as to not pass solar energy by reflecting it and said third dome being constructed so as to transmit any energy that reaches it to the ground to be conveyed away, and a second section of copper tubing wound helically around said third dome and coupled in series with said section of copper tubing would helically around said first dome.

3. Apparatus according to claim 1 and further including means for storing the fresh water condensed in said means for condensing.

4. Apparatus according to claim 1 and further including means interposed between said other end of said tubing and said condensing means for separating out salt carried along with said steam.

5. Apparatus according to claim 1 wherein said means for supplying salt water to said tubing comprises at least a pump and wherein said means coupled to said other end comprise valve means for selectively coupling said other end of said tubing to said discharge line.

6. Apparatus according to claim 5 and further including a gravity feed tank between said tubing and said pump.

7. Apparatus according to claim 6 and further including means directing the water supplied to said tubing through said condensing means prior to being supplied to said copper tubing.

8. Apparatus according to claim 4 wherein said means for separating salt comprises a unit having at least one trough and a hinged door for emptying said trough.

9. Apparatus according to claim 8 wherein said third dome is made of glass in order to better absorb energy reaching it and transmit it to the ground and said fourth dome made of plastic and exteriorly reflective so as to reflect away as much solar energy as possible.

10. Apparatus according to claim 9 wherein said first dome is made of glass transparent to the sun's rays to permit passage of solar energy therethrough and said second dome of plastic so as to retard transmission of energy therethrough.

11. Apparatus according to claim 8 and further including:

(a) means coupled to one end of said copper tubing for supplying salt water thereto; and (b) means coupled to the other end of said copper tubing for condensing steam formed therein.

12. A structure for evaporating salt water using energy from the sun comprising:

(a) a first dome having a first diameter;

(b) a second dome of a second larger diameter placed concentrically around said first dome, said second dome being of a material which is capable of transmitting solar energy;

(c) a first section of copper tubing wound helically around said first dome in the space between said first dome and second dome whereby said copper tubing will be heated to a high degree when exposed to solar energy;

(d) a third dome having a third diameter; and (e) a fourth dome having a diameter larger than said third dome, a second section of copper tubing wound helically around said third dome and coupled in series with said first section of copper tubing, said fourth dome being constructed so as to not pass solar energy by reflecting it and said third dome constructed so as to transmit any energy which reaches it to the ground, said third and fourth domes and said second section of tubing acting to condense steam formed in said first section.

13. Apparatus according to claim 12 wherein said third dome is made of glass in order to better absorb energy reaching it and transmit it to the ground and said fourth dome made of plastic and exteriorly reflective so as to reflect away as much solar energy as possible.

14. Apparatus according to claim 12 wherein said first dome is made of glass transparent to the sun's rays to permit passage of solar energy therethrough and said second dome of plastic so as to retard transmission of energy therethrough.

15. Apparatus according to claim 4 and further including means coupled to said tubing to permit connecting said other end of said tubing to a discharge line thereby permitting water to be passed through said tubing and said discharge line to flush out salt deposited within said copper tubing.

16. A structure for evaporating salt water using energy from the sun comprising:

(a) a first dome having a first diameter;

(b) a second dome of a second larger diameter placed concentrically around said first dome to form a closed space between said first and second domes, said second dome being of a material which is capable of transmitting solar energy;

(c) copper tubing having two ends wound helically around said first dome in the space between said first dome and second dome whereby said copper tubing will be heated to a high degree when exposed to solar energy to evaporate any salt water contained therein;

(d) means coupled to one end of said copper tubing for supplying salt water thereto at a rate such that all salt water supplied thereto will be evaporated;

(e) means coupled to the other end of said copper tubing for condensing steam formed therein; and (f) means interposed between said other end of said tubing and said condensing means for separating out salt carried along with said steam.

* * * * *

UNITED STATES PATENT AND TRADEMARK OFFICE
CERTIFICATE OF CORRECTION

PATENT NO. : 4,154,657

DATED : May 15, 1979

INVENTOR(S) : Nancy L. Dennen

It is certified that error appears in the above-identified patent and that said Letters Patent are hereby corrected as shown below:

Col. 6, line 2 change "insulating" to -- insulation --

Col. 6, line 23, after "by the" delete -- comma --

Col. 7, line 62, change "8" to -- 12 --

Signed and Sealed this

Eleventh Day of September 1979

[SEAL]

Attest:

LUTRELLE F. PARKER

*Attesting Officer*     *Acting Commissioner of Patents and Trademarks*